US009164647B2

(12) United States Patent
Ueno et al.

(10) Patent No.: US 9,164,647 B2
(45) Date of Patent: Oct. 20, 2015

(54) GRAPHICAL USER INTERFACE DEVICE

(75) Inventors: Yohei Ueno, Tokyo (JP); Tadashi Oi, Tokyo (JP); Kazuyuki Mori, Tokyo (JP); Akira Kobashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 13/160,938

(22) Filed: Jun. 15, 2011

(65) Prior Publication Data

US 2012/0060091 A1 Mar. 8, 2012

(30) Foreign Application Priority Data

Sep. 3, 2010 (JP) ................................. 2010-197273
Jan. 14, 2011 (JP) ................................. 2011-005920

(51) Int. Cl.
*G06F 3/00* (2006.01)
*G06F 3/048* (2013.01)
*G06F 3/0481* (2013.01)

(52) U.S. Cl.
CPC .................................. *G06F 3/0481* (2013.01)

(58) Field of Classification Search
CPC . G06F 9/4446; G06F 3/0481; G06F 3/04895; G06F 9/4443; G06Q 30/02
USPC ........................................................ 715/705
See application file for complete search history.

(56) References Cited

U.S. PATENT DOCUMENTS

| | | | | |
|---|---|---|---|---|
| 4,803,039 A | * | 2/1989 | Impink et al. | 376/216 |
| 5,631,825 A | * | 5/1997 | van Weele et al. | 700/83 |
| 5,953,707 A | * | 9/1999 | Huang et al. | 705/7.25 |
| 6,188,402 B1 | * | 2/2001 | Csipkes et al. | 715/705 |
| 6,661,437 B1 | | 12/2003 | Miller et al. | |
| 7,120,868 B2 | * | 10/2006 | Salesin et al. | 715/249 |
| 7,272,789 B2 | * | 9/2007 | O'Brien | 715/247 |
| 7,404,200 B1 | | 7/2008 | Hailey et al. | |

(Continued)

FOREIGN PATENT DOCUMENTS

| | | |
|---|---|---|
| CN | 101094352 A | 12/2007 |
| CN | 101482794 A | 7/2009 |

(Continued)

OTHER PUBLICATIONS

Search Report issued Oct. 28, 2013 in Chinese Patent Application No. 2011102131263 with English language translation.

*Primary Examiner* — Doon Chow
*Assistant Examiner* — Shourjo Dasgupta
(74) *Attorney, Agent, or Firm* — Oblon, McClelland, Maier & Neustadt, L.L.P.

(57) ABSTRACT

A graphical user interface device includes an operation procedure information database, a display element information database, an operation determination section, a display element selection section, and an integrated procedure and display-element screen preparation section. Procedure information and a display item to be operated by an operator are registered in the operation procedure information database. The procedure information is text information forming an operation manual. The operation determination section determines a current operation step based on information given from an actual plant. The integrated procedure and display-element screen preparation section prepares a layout of an operation screen allowing the procedure information and the display item of the current operation step to be simultaneously displayed on a single screen of the input/output equipment.

9 Claims, 12 Drawing Sheets

(56) References Cited

U.S. PATENT DOCUMENTS

| | | | |
|---|---|---|---|
| 7,496,946 B1 | 2/2009 | Wehmeyer et al. | |
| 7,533,400 B1 | 5/2009 | Hailey et al. | |
| 7,752,558 B2 * | 7/2010 | Ohashi | 715/763 |
| 7,877,686 B2 * | 1/2011 | Abbott et al. | 715/712 |
| 2002/0122067 A1 * | 9/2002 | Geigel et al. | 345/788 |
| 2005/0055635 A1 * | 3/2005 | Bargeron et al. | 715/525 |
| 2005/0149933 A1 * | 7/2005 | Saito et al. | 718/100 |
| 2005/0155000 A1 * | 7/2005 | Weiler et al. | 715/840 |
| 2005/0240865 A1 * | 10/2005 | Atkins et al. | 715/517 |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0123345 A1 | 6/2006 | Parimi | |
| 2007/0057965 A1 * | 3/2007 | Burago et al. | 345/619 |
| 2007/0071220 A1 * | 3/2007 | Weldon et al. | 379/235 |
| 2007/0079236 A1 * | 4/2007 | Schrier et al. | 715/517 |
| 2007/0162844 A1 * | 7/2007 | Woodall et al. | 715/517 |
| 2008/0204426 A1 | 8/2008 | Hotelling et al. | |
| 2008/0211775 A1 | 9/2008 | Hotelling et al. | |
| 2008/0211783 A1 | 9/2008 | Hotelling et al. | |
| 2008/0211784 A1 | 9/2008 | Hotelling et al. | |
| 2008/0211785 A1 | 9/2008 | Hotelling et al. | |
| 2008/0231610 A1 | 9/2008 | Hotelling et al. | |
| 2009/0132578 A1 * | 5/2009 | Parikh et al. | 707/102 |
| 2009/0262144 A1 | 10/2009 | Kawagishi et al. | |
| 2011/0035693 A1 | 2/2011 | Ueno et al. | |
| 2012/0054650 A1 * | 3/2012 | Bliss et al. | 715/764 |
| 2012/0293440 A1 | 11/2012 | Hotelling et al. | |

FOREIGN PATENT DOCUMENTS

| | | |
|---|---|---|
| CN | 101515174 A | 8/2009 |
| CN | 101526875 A | 9/2009 |
| JP | 6-27287 | 2/1994 |
| JP | 3380364 | 12/2002 |
| JP | 3392243 | 1/2003 |
| JP | 4417301 | 12/2009 |

* cited by examiner

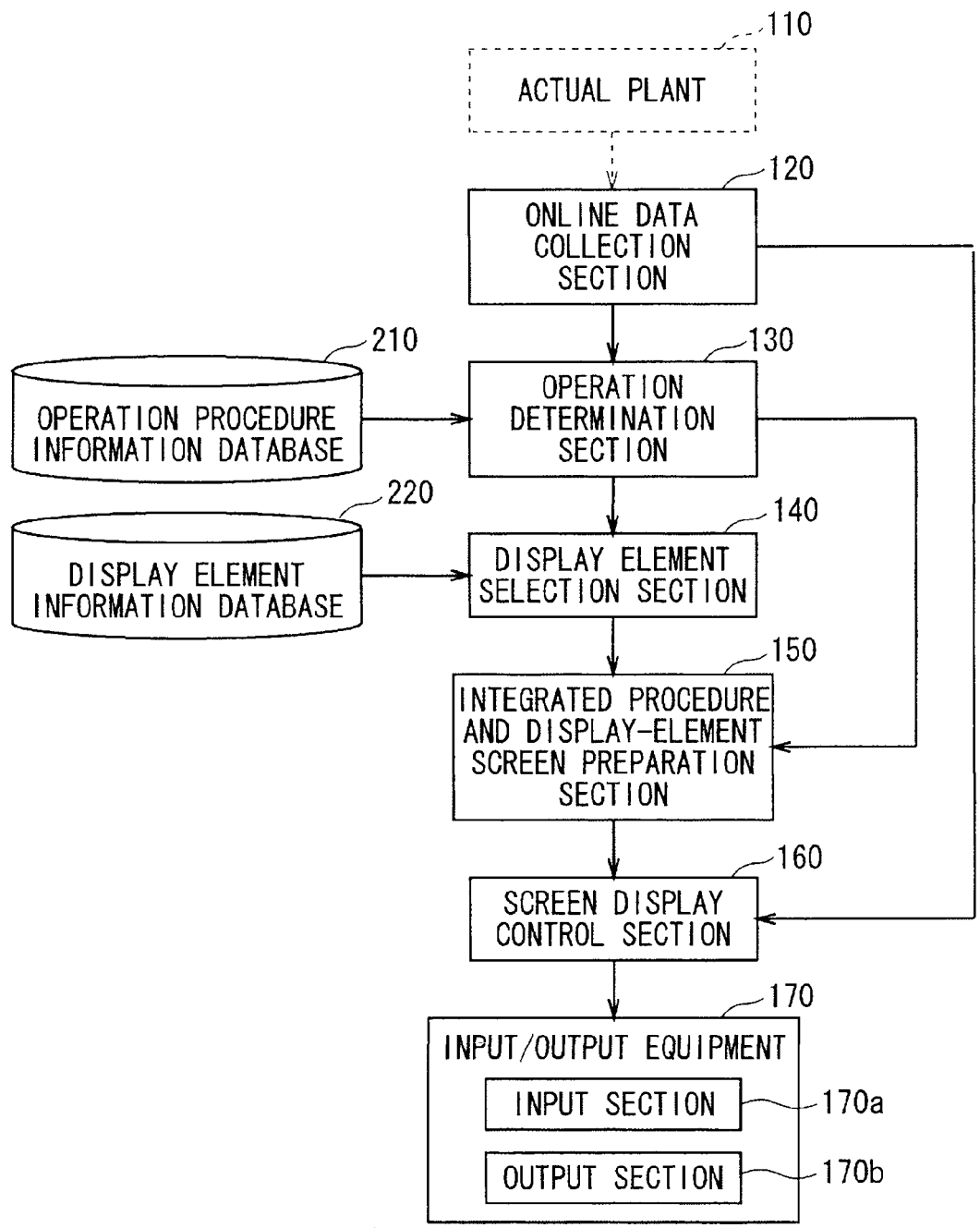

F I G. 8
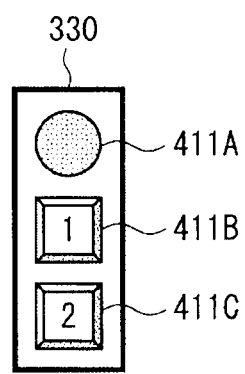
F I G. 9
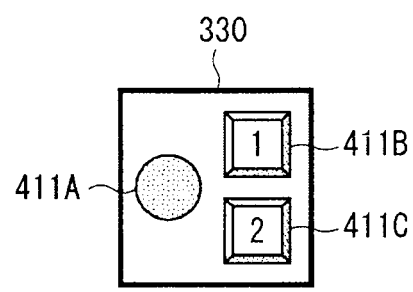

F I G. 1 5
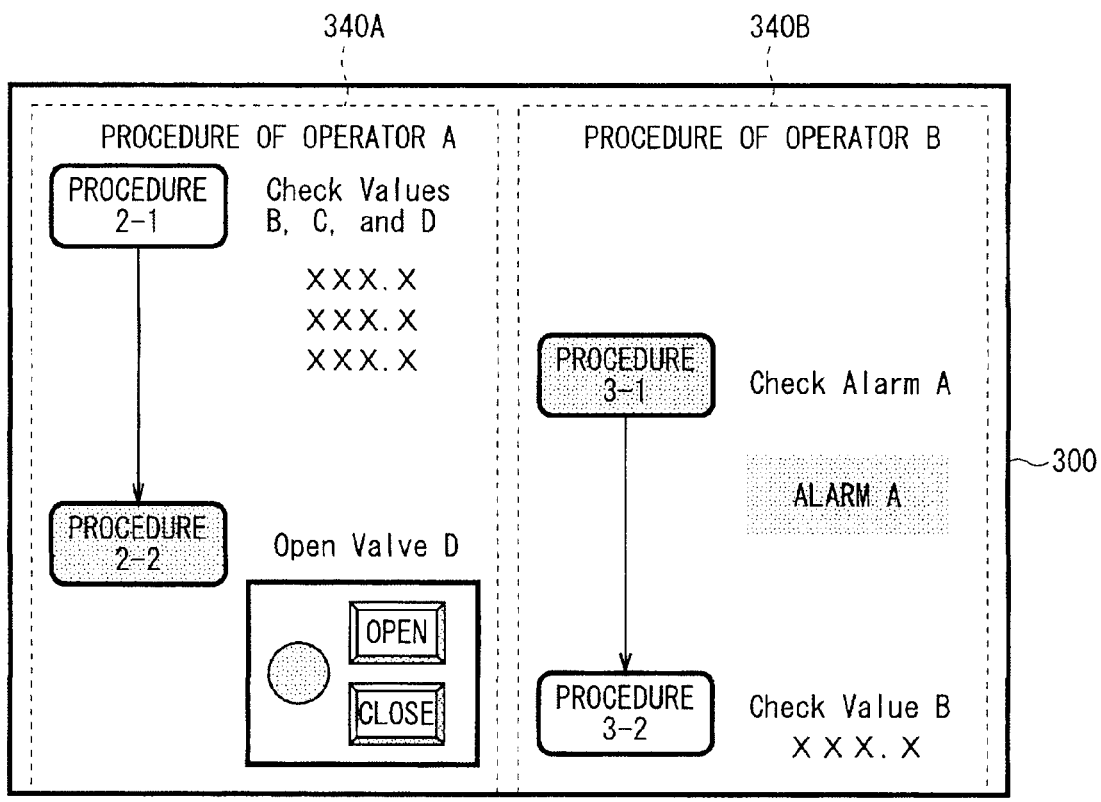

GRAPHICAL USER INTERFACE DEVICE

BACKGROUND OF THE INVENTION

1. Field of the Invention

The present invention relates to a graphical user interface device for use in a monitor control system for a monitor control of a plant.

2. Description of the Background Art

For a monitor control of a large-scale plant, in general, information of sensors installed in equipments of the plant is collectively monitored by a central monitor-control panel.

In recent years, software implementation of the central monitor-control panel is promoted, and a display of a plant measurement value and a control of equipments in the central monitor-control panel are implemented by a graphical user interface, instead of a hardware indicator and a hardware switch which have been conventionally used. This can downsize a monitor control system and reduce an operation load imposed on an operator.

Normally, a monitor control service system in a monitor control system has at least one control operation worker and at least one operation supervisor. Each of the control operation worker and the operation supervisor is provided with a special plant monitor control input/output device. In performing a monitor control service, the operation supervisor and the control operation worker use their own input/output devices, and instructions, confirmations, and reports among them are made orally during the operation. In particular, in performing a periodic inspection of the plant and an operation concerning an accident, not only the instructions, the confirmations, and the reports are made orally, but also procedures described in a plant operation manual are checked and the operation is performed in accordance with the manual.

In a large-scale plant, ensuring the safety is a strong demand, and thus, as a general rule, an operator does not solely perform an operation but a plurality of operators perform the operation while confirming the contents of the operation with one another.

In the large-scale plant, the number of items for the monitor control is large, which increases the number of pages of a monitor control screen and the amount of information per page. Accordingly, in a case where an operator actually performs a periodic inspection of the plant, and the like, the operator has to operate an input/output device and the like while searching the plant operation manual describing a lot of display items for a display item necessary for a current operation. Thus, in a case of performing the periodic inspection and the like, a high cognitive load is imposed on the operator.

In a technique proposed in Japanese Patent Application Laid-Open No. 1994-27287, display items to be operated for the operation of a plant in an abnormal state or in a case of an accident are preliminarily recorded in a database, and an image displaying the display item to be displayed by a system is automatically prepared based on data given from the plant. This device enables an operator to easily perform a current operation.

In order that the operator can properly perform operations in the operation of the large-scale plant mentioned above, it is desirable that the operator correctly understand both of the purpose and a method of the operation described in the plant operation manual. In the device disclosed in Japanese Patent Application Laid-Open No. 1994-27287, although the display item to be operated is displayed, the purpose of the operation is not displayed, and the signification of information of an observed data index value is not displayed. Therefore, in any case, a problem rises that the operator has to perform the operation while separately checking the plant operation manual in order to understand them.

SUMMARY OF THE INVENTION

The present invention has been made in view of the problem mentioned above, and an object of the present invention is to provide a technique allowing an operation manual to be easily checked during an operation.

The present invention is directed to a graphical user interface device for use in a monitor control system for a monitor control of a plant, and the graphical user interface device includes an operation procedure information database, a display element information database, an operation determination section, a display element selection section, and an integrated procedure and display-element screen preparation section. In the operation procedure information database, text information forming an operation manual and a display item to be operated by an operator are registered for each of operation steps. In the display element information database, display element information about a display element included in the display item is registered. The operation determination section determines a current operation step based on information given from the plant. The display element selection section selects, from the display element information database, the display element information corresponding to the display item of the current operation step determined by the operation determination section. Based on the display element information selected by the display element selection section, the integrated procedure and display-element screen preparation section prepares a layout of an operation screen allowing the text information and the display item corresponding to the current operation step to be simultaneously displayed on a single screen of an interface device.

The text information of the plant operation manual and the display item to be operated regarding the current operation step are displayed on the single screen of the interface device. This enables the operator to easily check the plant operation manual on the screen of the interface device, and additionally to perform an operation of the current operation step so as to match the operation with the plant operation manual.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of a graphical user interface device according to a preferred embodiment 1;

FIG. 8 is a diagram showing an example of arrangement of display elements according to the preferred embodiment 4;

FIG. 9 is a diagram showing an example of arrangement of display elements according to the preferred embodiment 4;

FIG. 15 is a diagram showing a layout of an operation screen prepared by the graphical user interface device according to the preferred embodiment 6.

DESCRIPTION OF THE PREFERRED EMBODIMENTS

Preferred Embodiment 1

Figure 2:
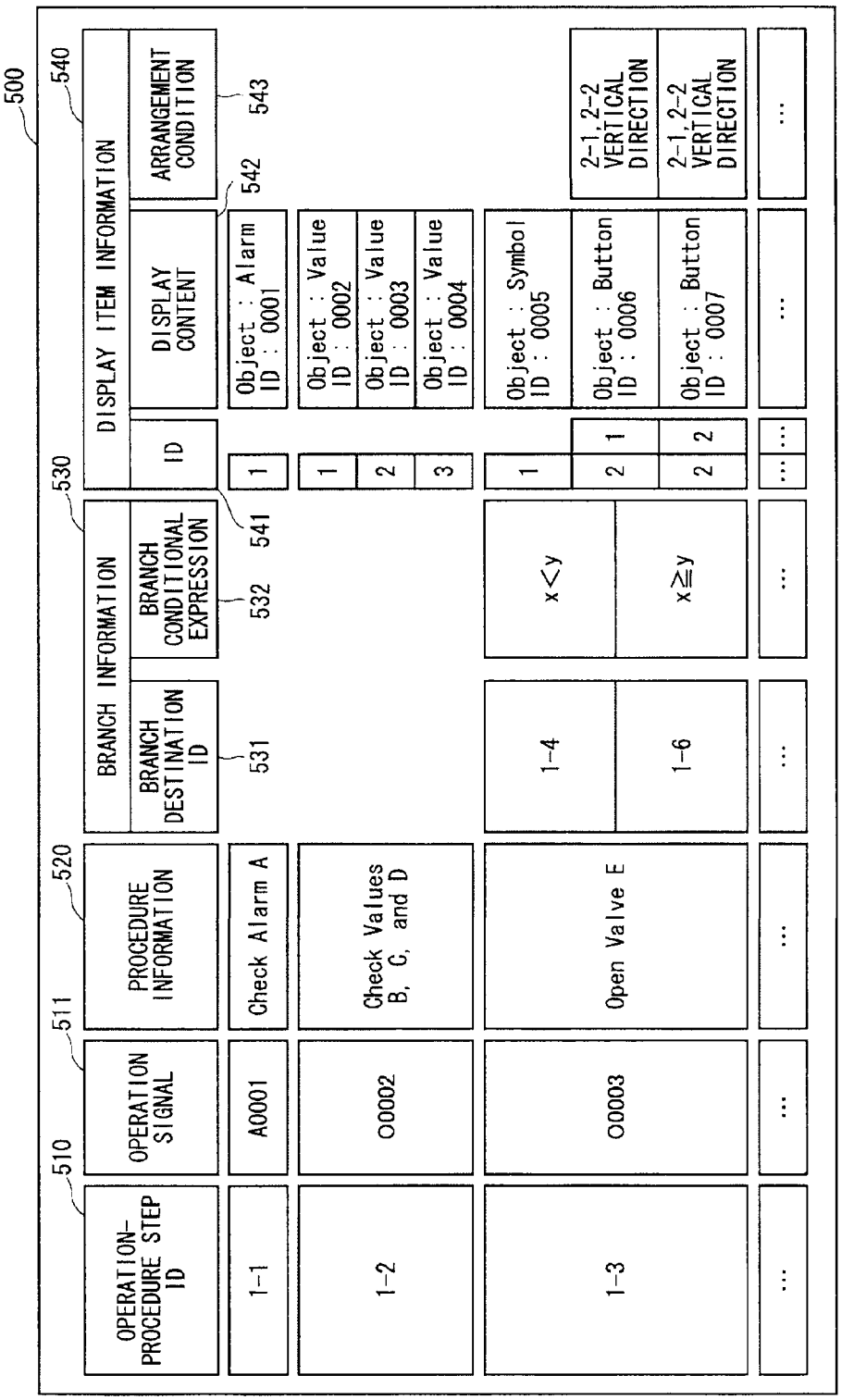
FIG. 2 is a diagram showing an example of contents registered in an operation procedure information database.

FIG. 1 is a diagram showing a configuration of a graphical user interface device according to a preferred embodiment 1 of the present invention. The graphical user interface device is a graphical user interface device for use in a monitor control system that performs a monitor control of an actual plant 110. The graphical user interface device includes an online data collection section 120, an operation determination section 130, a display element selection section 140, an integrated procedure and display-element screen preparation section 150, a screen display control section 160, an input/output equipment 170 having a screen, an operation procedure information database 210, and a display element information database 220.

The input/output equipment 170 itself is an interface device, and functionally has an input section 170*a* and an output section 170*b*. The input section 170*a* receives an external operation such as an input operation made by an operator. The output section 170*b* displays an image on the screen thereof.

Firstly, prior to a detailed description of the graphical user interface device, an outline will be described.

In the operation procedure information database 210, text information forming a plant operation manual and a display item to be operated by the operator are registered. The operation determination section 130 determines an operation step (hereinafter referred to as a "current operation step") that should be currently operated or is being currently operated, based on information given from the actual plant 110. The display element selection section 140 selects information about the current operation step from information of display elements included in the display item registered in the display element information database 220. The integrated procedure and display-element screen preparation section 150 prepares a layout of an operation screen allowing the text information and the display item of the current operation step to be simultaneously displayed on a single screen of the input/output equipment 170, based on the information selected by the display element selection section 140.

In the graphical user interface device according to this preferred embodiment, the text information of the plant operation manual and the display item to be operated by the operator with respect to the current operation step are displayed on the single screen. This enables the operator to easily check the operation manual on the screen of the input/output equipment 170 without taking the trouble of opening a booklet, or the like, of the operation manual, and enables the operator to perform an operation of the current operation step so as to match the operation with the operation manual displayed on the screen.

Here, the "operation" includes not only the external operation made in the input section 170*a* but also monitoring of a measurement value of the actual plant 110 which is displayed on the input/output equipment 170. Additionally, a supervisor and a control operation worker of the actual plant 110 are not distinguished from each other, and each of them is called the "operator". Next, component parts of the graphical user interface device according to this preferred embodiment will be described in detail.

A measurement sensor (not shown) is placed at each of measurement points of the actual plant 110. The measurement sensor sends measurement value information indicating a measurement value measured by itself, to the online data collection section 120. The online data collection section 120 collects measurement value information sent from a plurality of measurement sensors, and transmits it to the operation determination section 130 and the screen display control section 160.

FIG. 2 is a diagram showing an example of contents of operation-procedure information 500 registered in the operation procedure information database 210. As shown in FIG. 2, the operation-procedure information 500 includes an operation-procedure step ID 510 uniquely assigned to each operation step, an operation signal 511, procedure information 520, branch information 530, and display item information 540.

Hereinafter, the operation-procedure information 500 will be described in detail. A description of the branch information 530 is omitted here, because the branch information 530 is information used in a preferred embodiment 3 which will be described later.

The operation-procedure step 1D 510 is an ID uniquely assigned to each operation step. The operation-procedure step 1D 510 allows identification of an operation procedure including a plurality of operation steps arranged in an order in which they should be operated. For example, in the operation-procedure step 1D 510 shown in FIG. 2, the ID "1-1" indicates an operation step "1" in an operation procedure "1", and the ID "1-2" indicates an operation step "2" in the operation procedure "1". In this manner, in this preferred embodiment, the operation procedure including the plurality of operation steps arranged in the order is registered in the operation procedure information database 210.

In the following description, for example, the description of "an operation step whose operation-procedure step 1D 510 is '1-2'" is sometimes simplified as "the operation step '1-2'".

The operation signal 511 is a generic term for signals such as an input signal outputted by the input/output equipment 170 in accordance with an input operation made by the operator, and an alarm signal generated based on the measurement value information of the actual plant 110. Each operation signal 511 is assigned a unique ID. The operation signal 511 is used for the operation determination section 130 determining the current operation step and the like, as will be described later.

The procedure information 520 is text information forming the plant operation manual, and registered for each operation-procedure step ID 510 (operation step). In the display item information 540, a display item to be operated by the operator is registered for each operation-procedure step ID 510 (operation step). Therefore, in this preferred embodiment, in the operation procedure information database 210, the procedure information 520 and the display item to be operated by the operator are registered for each operation step.

In the display item information 540, a display item ID 541 and a display content 542 are registered for each operation-procedure step ID 510. An arrangement condition 543 is also registered as appropriate.

The display item ID 541 is an ID having a hierarchical structure to classify the display elements into hierarchical groups. As described above, the display element is included in the display item to be operated by the operator. That is, one display item includes at least one display element.

The display content 542 includes a display element attribution 610 and a display element ID 620. The display element attribution 610 indicates an attribution of the display element. The display element ID 620 is uniquely assigned to each display element. For example, referring to FIG. 2, a display item whose operation-procedure step ID 510 is "1-3" includes three display elements indicated by the display item information 540. More specifically, the display item ID 541 indicating "1" in the left part, the display element attribution 610 indicating "Symbol", and the display element ID 620 indicating "0005" are registered as a first display element. The display item ID 541 indicating "2" and "1" in the left and right parts, respectively, the display element attribution 610 indicating "Button", and the display element ID 620 indicating "0006" are registered as a second display element. The display item ID 541 indicating "2" and "2" in the left and right parts, respectively, the display element attribution 610 indicating "Button", and the display element ID 620 indicating "0007" are registered as a third display element. The display element attribution 610 and the display element ID 620 registered in the display content 542 form display element information 600 which will be described later.

In the following, for example, the description of "a display element whose display element attribution 610 indicates 'Button'" is sometimes simplified as "a display element indicating 'Button'".

The arrangement condition 543 is information about restriction of arrangement of the display element. For example, referring to FIG. 2, in the operation-procedure step ID 510 indicating "1-3", for each of the two display elements indicating "Button", the arrangement condition 543 indicating "vertical direction" is registered. In this case, these two display elements are arranged in the vertical direction, instead of a horizontal direction or the like.

Referring to FIG. 1 again, based on the measurement value information transmitted from the online data collection section 120, in other words, based on the information given from the actual plant 110, the operation determination section 130 matches the information with the operation-procedure information 500 registered in the operation procedure information database 210, to determine the current operation step. For example, the operation determination section 130 determines the current operation step by using a method of, for example, pattern matching between the information given from the actual plant 110 and a history of occurrence of the operation signal 511 in the operation-procedure information 500.

In the determination of the current operation step, the operation determination section 130 also determines a plurality of operation steps (hereinafter, sometimes referred to as "same-procedure operation steps") included in the same operation procedure as the current operation step is. For example, when the operation step "1-3" is determined as the current operation step, the operation determination section 130 determines, as the same-procedure operation steps, operation steps "1-1", "1-2", "1-3", and "1-4" included in the operation procedure "1".

Figure 3:
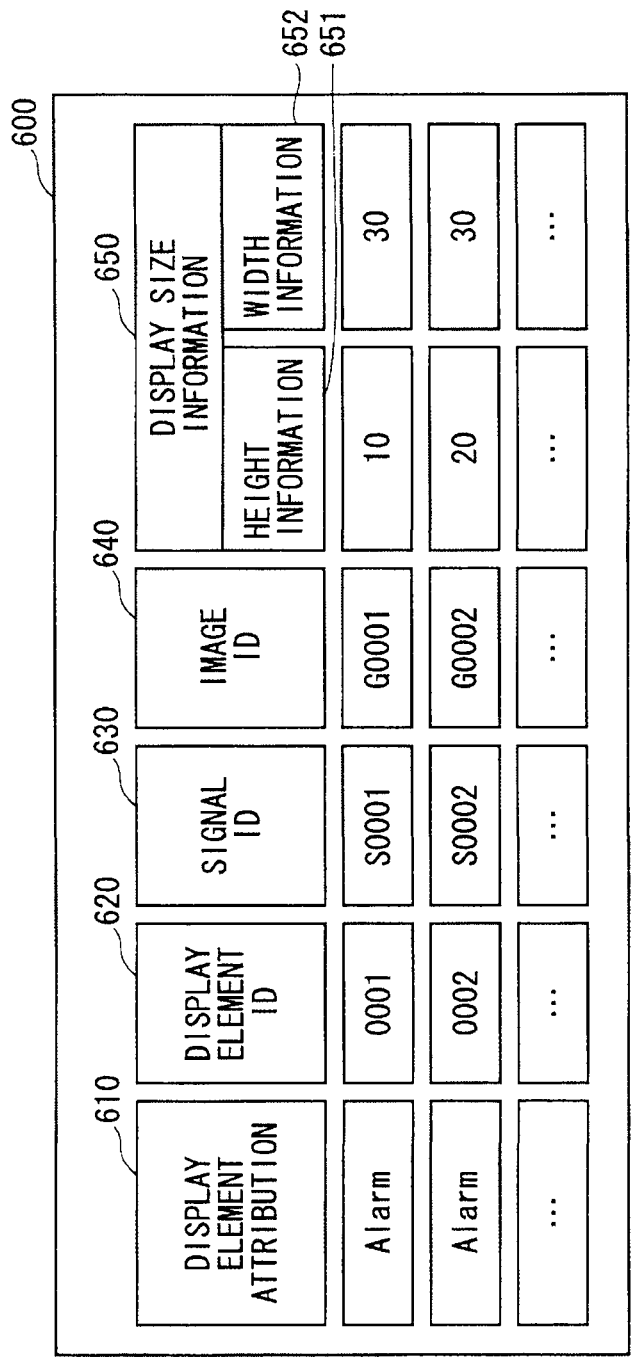
FIG. 3 is a diagram showing an example of contents registered in a display element information database.

FIG. 3 is a diagram showing an example of contents of the display element information 600 registered in the display element information database 220. As shown in FIG. 3, the display element information 600 concerning the display elements is registered in the display element information database 220. The display element information 600 is composed of the display element attribution 610, the display element ID 620, a signal ID 630, an image ID 640, and display size information 650. Next, component parts of the display element information 600 will be described.

As described above, the display element attribution 610 indicates an attribution of the display element, and the display element ID 620 is an ID uniquely assigned to each display element. As shown in FIG. 3, the signal ID 630, the image ID 640, and the display size information 650 are registered for each combination of the display element attribution 610 and the display element ID 620.

The signal ID 630 is an identifier for identifying the signal of the measurement value information of the actual plant 110 or the signal generated based on the measurement value information. The image ID 640 is an identifier indicating an image of the display element registered on the system. The image of the display element may be directly registered in the field of the image ID 640. The display size information 650 is information about the size of the display element which is displayed as the display item on the screen. The display size information 650 includes height information 651 and width information 652.

Referring to FIG. 1 again, the display element selection section 140 obtains the display element attribution 610 and the display element ID 620 from the above-described display content 542, with respect to the display item of the current operation step determined by the operation determination section 130. Then, based on the display element attribution 610 and the display element ID 620 thus obtained, the display element selection section 140 selects the corresponding signal ID 630, image ID 640, and display size information 650 from the display element information database 220. In this manner, the display element selection section 140 selects the display element information 600 from the display element information database 220, with respect to the display item of the current operation step determined by the operation determination section 130. For the same-procedure operation steps other than the current operation step, the display element selection section 140 similarly selects the display element information 600 from the display element information database 220 with respect to the display items of the same-procedure operation steps determined by the operation determination section 130.

Based on the display element information 600 selected by the display element selection section 140, the integrated procedure and display-element screen preparation section 150 prepares a layout of the operation screen that allows the procedure information 520 and the display item of the current operation step and the like to be simultaneously displayed on a single screen of the input/output equipment 170. The preparation of the layout of the operation screen will be described in detail later.

The screen display control section 160 incorporates the measurement value information collected by the online data collection section 120 to the layout of the operation screen prepared by the integrated procedure and display-element screen preparation section 150, thus generating an online monitor control screen.

The online monitor control screen generated by the screen display control section 160, that is, the layout of the operation screen incorporated with the measurement value information, is displayed in the input/output equipment 170, and thereby viewed by the operator and the like. In this preferred embodiment, the input/output equipment 170 such as a touch panel device, which is hardware including the input section 170*a* and the output section 170*b*, is supposed as the interface device. However, the interface device is not limited thereto. The input section 170*a* and the output section 170*b* may be configured as separate hardware, such as a keyboard and a mouse serving as the input section 170*a* and a display device serving as the output section 170*b*.

Next, a preparation operation of the integrated procedure and display-element screen preparation section 150 will be described.

Figure 4:
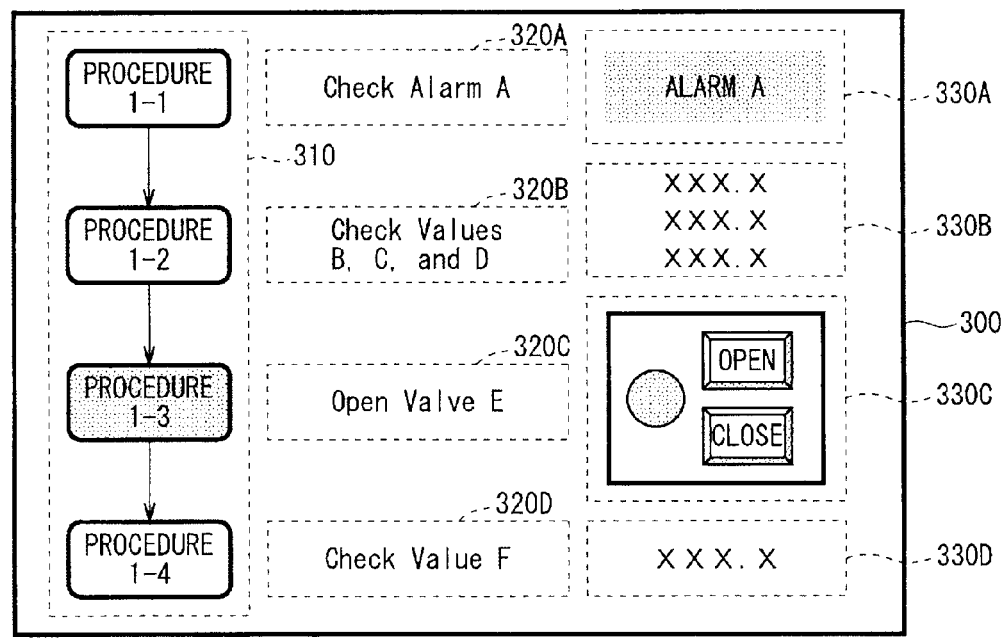
FIG. 4 is a diagram showing a layout of an operation screen prepared by the graphical user interface device according to the preferred embodiment 1.

FIG. 4 is a diagram showing an exemplary layout of the operation screen prepared by the integrated procedure and display-element screen preparation section 150 according to this preferred embodiment and displayed within an outer frame 300 of a single screen of the input/output equipment 170. Hereinafter, a specific description of the preparation operation will be given with reference to FIG. 4. In FIG. 4, it is assumed that the operation determination section 130 determines the operation step "1-3" as the current operation step, and determines the operation steps of "1-1", "1-2", "1-3", and "1-4" as the same-procedure operation steps.

As shown in FIG. 4, the operation-procedure step IDs 510 indicating "1-1" to "1-4" of the same-procedure operation steps including the current operation step, which are determined by the operation determination section 130, are displayed in a procedure-sequence display 310 placed at a left part of the screen, by using a display method in the form of a sequence diagram. For example, in the procedure-sequence display 310, the operation-procedure step 1D 510 indicating "1-1" is displayed as "procedure 1-1". In the procedure-sequence display 310, the current operation step (here, the "procedure 1-3") is highlighted so as to be distinguishable from the other operation steps. This can bring the operator's attention to the current operation step.

To the right of the operation-procedure step IDs 510 displayed in the procedure-sequence display 310, the procedure information 520 each corresponding to each of the operation-procedure step IDs 510 is displayed in procedure information displays 320A to 320D, respectively. For example, the procedure information 520 indicating "Open Valve E" corresponds to the operation-procedure step 1D 510 indicating "1-3" shown in FIG. 3. Accordingly, as shown in FIG. 4, the procedure information 520 indicating "Open Valve E" is displayed in a procedure information display 320C to the right of "procedure 1-3" in the procedure-sequence display 310.

At the right side of the operation-procedure step IDs 510 displayed in the procedure-sequence display 310 (to the right of the procedure information displays 320A to 320D), the display items of the display item information 540 corresponding the operation-procedure step IDs 510 are displayed in an image information displays 330A to 330D. That is, images of a plurality of display elements included in the display items are displayed in the image information displays 330A to 330D.

In an example, referring to the operation-procedure information 500 shown in FIG. 3, three display elements indicating "Value" are registered in the display item information 540 corresponding to the operation-procedure step 1D 510 indicating "1-2". Here, in a case where the display element attribution 610 indicates "Value", the screen display control section 160 incorporates the measurement value information collected by the online data collection section 120 into the display element. Hereinafter, in a diagram showing a layout of the operation screen, the measurement value information incorporated into the display element is represented by "XXX.X". In this manner, as shown in FIG. 4, a display item including three display elements (three types of measurement value information) is displayed in the image information display 330B to the right of the procedure information display 320B. The image information display 330B is an object to be monitored by the operator.

In another example, referring to the operation-procedure information 500 shown in FIG. 3, three display elements in total indicating "Symbol", "Button", and "Button" are registered in the display item information 540 corresponding to the operation-procedure step 1D 510 indicating "1-3". Accordingly, as shown in FIG. 4, a display item including three display elements (images of one circular mark and two buttons) is displayed in the image information display 330C to the right of the procedure information display 320C. The image information display 330C is an object to be operated by the operator.

In this preferred embodiment, an area (hereinafter referred to as a "display element area") where one display element is displayed on the layout of the operation screen has a rectangular shape.

The size of the display element area is defined by the display size information 650 shown in FIG. 3, or the like. The display element ID 620 indicating "0001" shown in FIG. 3 is taken as an example. A display element area having a height of 10 or more and a width of 30 or more is defined for a display element corresponding to the display element ID 620 indicating "0001", that is, for an image represented by the image ID 640 indicating "G0001". On the other hand, for text information and numerical value information such as measurement value information, a display element area corresponding to the number of characters and the number of lines is defined.

A limiting condition regarding arrangement of the display element areas is defined by the display item ID 541 and the arrangement condition 543. The integrated procedure and display-element screen preparation section 150 determines arrangement of the display element areas such that the display element areas cannot overlap each other and can satisfy the limiting condition regarding arrangement. In the arrangement of the display element areas, a rule-based operation is performed in which, for example, the display element areas are sequentially arranged from the left side of the screen, or a determination is made using a mathematical programming.

As described above, based on the display element information 600 selected by the display element selection section 140, the integrated procedure and display-element screen preparation section 150 automatically prepares a layout of the operation screen that allows the procedure information 520 and the display item of the current operation step to be simultaneously displayed on a single screen of the input/output equipment 170. In this preferred embodiment, based on the display element information 600 selected by the display element selection section 140, the integrated procedure and display-element screen preparation section 150 automatically prepares a layout of the operation screen that allows the procedure information 520 and the display items of the plurality of operation steps included in the same operation procedure as the current operation step is to be simultaneously displayed on a single screen of the input/output equipment 170.

In the graphical user interface device according this preferred embodiment described above, with respect to the current operation step, the text information of the plant operation manual and the display item to be operated are displayed on the single screen of the input/output equipment 170. This enables the operator to easily check the plant operation manual on the screen of the input/output equipment 170 and also perform an operation of the current operation step so as to match the operation with the plant operation manual.

Preferred Embodiment 2

In the preferred embodiment 1, in a case where one operation procedure described in the plant operation manual includes a large number of operation steps, the single screen of the input/output equipment 170 may not display all of the same-procedure operation steps. Therefore, in this preferred embodiment 2, a part of the same-procedure operation steps is extracted and displayed. Hereinafter, in a description of a graphical user interface device according to this preferred embodiment, the same component parts as those of the graphical user interface device according to the preferred embodiment 1 will be denoted by the common corresponding reference numerals, to omit repetition of the description.

Figure 5:
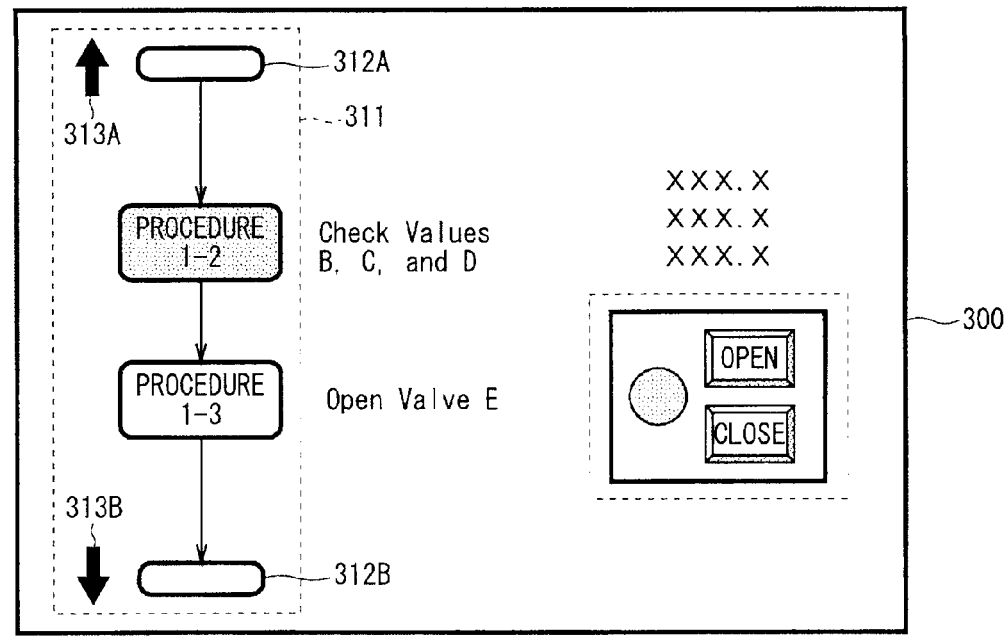
FIG. 5 is a diagram showing a layout of an operation screen prepared by a graphical user interface device according to a preferred embodiment 2.

FIG. 5 is a diagram showing an exemplary layout of the operation screen prepared by the integrated procedure and display-element screen preparation section 150 according to this preferred embodiment and displayed within the outer frame 300 of a single screen of the input/output equipment 170. The integrated procedure and display-element screen preparation section 150 according to this preferred embodiment adds the same-procedure operation steps before and after the current operation step, to thereby prepare a layout of the operation screen. During the preparation, in a case where the integrated procedure and display-element screen preparation section 150 determines that an outline of the layout of the operation screen exceeds a display size (screen size) of the input/output equipment 170, the integrated procedure and display-element screen preparation section 150 prepares a layout of the operation screen that allows only the current operation step and the same-procedure operation steps around the current operation step to be displayed, as shown in FIG. 5.

Thus, in this preferred embodiment, in a case where it is impossible to simultaneously display, on a single screen of the input/output equipment 170, the procedure information 520 and the display items of all operation steps included in the same operation procedure as the current operation step, the integrated procedure and display-element screen preparation section 150 prepares a layout of the operation screen that allows the procedure information 520 and the display items of only the current operation step and the operation steps around the current operation step to be simultaneously displayed on a single screen of the input/output equipment 170. As a result, as shown in FIG. 5, a part 311 of the procedure-sequence display 310 described above is displayed.

In an example shown in FIG. 5, icon displays 312A and 312B, and arrow icons 313A and 313B are additionally displayed. The icon display 312A indicates the existence of the same-procedure operation step preceding the top operation step displayed on the screen. The icon display 312B indicates the existence of the same-procedure operation step following the last operation step displayed on the screen.

Each time the operator operates the arrow icon 313A once, the integrated procedure and display-element screen preparation section 150 prepares a layout of the operation screen such that the screen displaying the operation steps can be scrolled up by one operation step. In the same manner, each time the operator operates the arrow icon 313B once, the integrated procedure and display-element screen preparation section 150 prepares a layout of the operation screen such that the screen displaying the operation steps can be scrolled down by one operation step. Thus, the operator can freely change the displayed operation steps by operating the arrow icons 313A and 313B.

In the graphical user interface device according to this preferred embodiment described above, in a case where it is impossible to simultaneously display, on a single screen of the input/output equipment 170, all operation steps included in the same operation procedure as the current operation step determined by the operation determination section 130, the display can be limited to the current operation step and the operation steps around the current operation step. This enables a display of necessary information without reducing the size of a character or a display symbol, and thus can suppress a deterioration in the visibility. Downsizing of the input/output equipment 170 can also be expected.

Preferred Embodiment 3

In general, the operation procedure described in the plant operation manual has a branch condition such that different procedures can be executed depending on the situation. In this preferred embodiment 3, an appropriate display can be made in a case where the operation procedure has branching. Hereinafter, in a description of a graphical user interface device according to this preferred embodiment, the same component parts as those of the graphical user interface device according to the preferred embodiment 1 will be denoted by the common corresponding reference numerals, to omit repetition of the description.

As shown in FIG. 2, branch information 530 that is information about branching is registered in the operation-procedure information 500. The branch information 530 is composed of a branch destination ID 531 and a branch conditional expression 532. The branch destination ID 531 represents the operation-procedure step 1D 510 of a branch destination. The branch conditional expression 532 represents a conditional expression for branching. Thus, in this preferred embodiment, the information about branching in the operation procedure is registered in the operation procedure information database 210. In an example of the operation-procedure information 500 shown in FIG. 2, after the operation step "1-3", a measurement value X and a reference value y are compared with each other. If the measurement value X is less than the reference value y, the procedure proceeds to the operation step "1-4". If the measurement value X is equal to or more than the reference value y, the procedure proceeds to the operation step "1-6".

Figure 6:
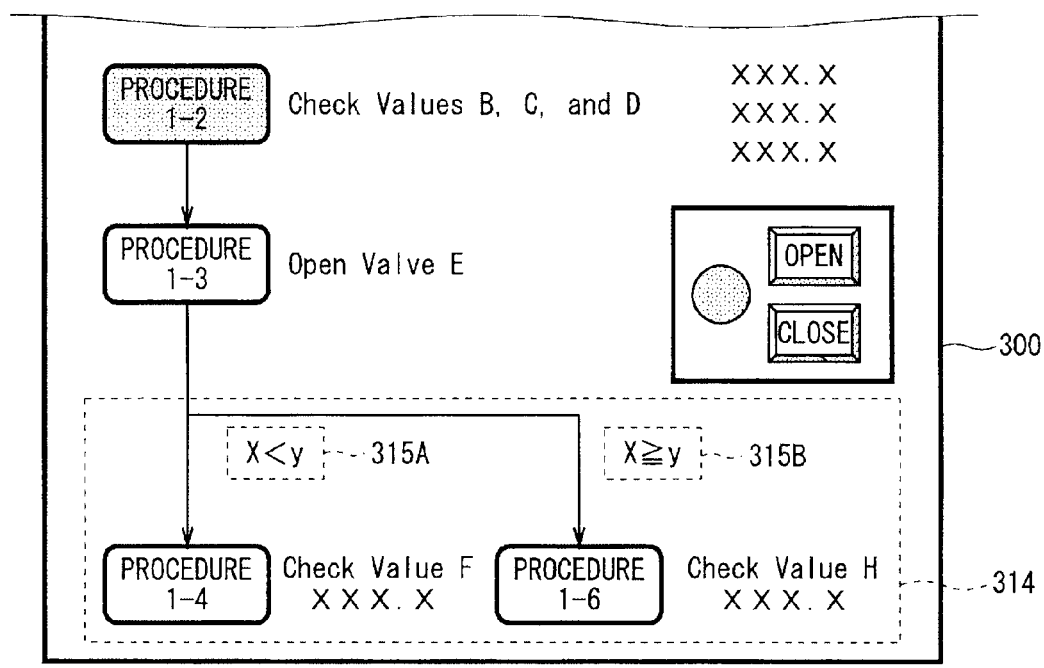
FIG. 6 is a diagram showing a layout of an operation screen prepared by a graphical user interface device according to a preferred embodiment 3.

FIG. 6 is a diagram showing an exemplary layout of the operation screen prepared by the integrated procedure and display-element screen preparation section 150 according to this preferred embodiment and displayed within the outer frame 300 of a single screen of the input/output equipment 170. The integrated procedure and display-element screen preparation section 150 according to this preferred embodiment adds the same-procedure operation steps before and after the current operation step, to thereby prepare a layout of the operation screen. During the preparation, in a case where the integrated procedure and display-element screen preparation section 150 determines that an operation procedure including the current operation step has branching, the integrated procedure and display-element screen preparation section 150 branches a corresponding portion of the procedure-sequence display 310. Then, the integrated procedure and display-element screen preparation section 150 prepares a layout of the operation screen that allows the procedure information 520 and the display item of the operation step of a branch destination, and a corresponding branch conditional expression 532 to be simultaneously displayed on a single screen of the input/output equipment 170 such that the procedure information 520 and the display item of the operation step of the branch destination can be associated with the corresponding branch conditional expression 532. As a result, as shown in FIG. 6, a branched portion 314 of the procedure-sequence display 310 is displayed, and the branch conditional expression 532 is also displayed in branch condition displays 315A and 315B.

Regarding branch of the operation procedure already executed, only the operation step actually performed may be displayed.

In the graphical user interface device according to this preferred embodiment described above, in a case where the operation procedure has branching, the operation step of the branch destination and the corresponding branch conditional expression 532 can be displayed while being associated with each other. This allows a visual display of conditional branching so that the operation procedure can be easily understood to reduce a cognitive load.

Preferred Embodiment 4

Hereinafter, in a description of a graphical user interface device according to this preferred embodiment, the same component parts as those of the graphical user interface device according to the preferred embodiment 1 will be denoted by the common corresponding reference numerals, to omit repetition of the description.

Figure 7:
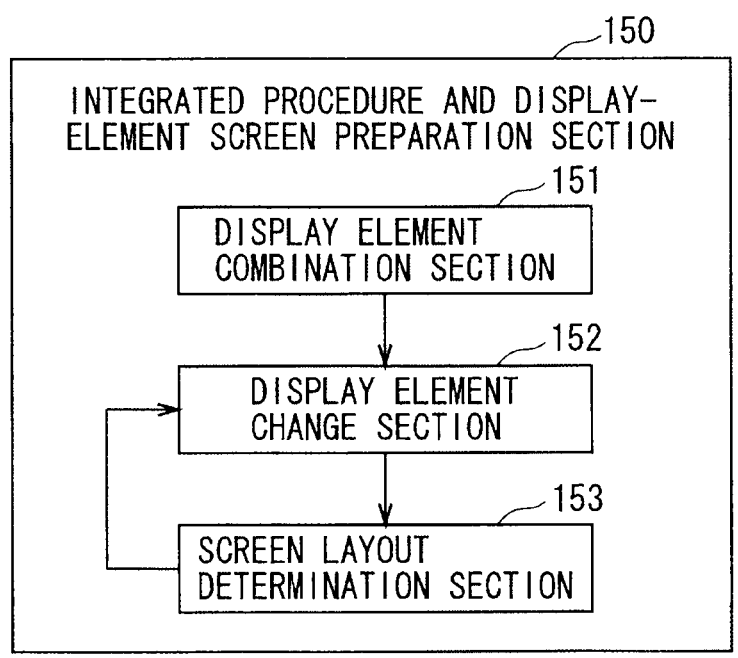
FIG. 7 is a block diagram showing a configuration of an integrated procedure and display-element screen preparation section according to a preferred embodiment 4.

FIG. 7 is a block diagram showing an internal configuration of the integrated procedure and display-element screen preparation section 150 according to this preferred embodiment 4. The integrated procedure and display-element screen preparation section 150 includes a display element combination section 151, a display element change section 152, and a screen layout determination section 153.

The display element combination section 151 classifies a plurality of display elements included in a display item into hierarchical groups, based on the display item ID 541 shown in FIG. 2. The number of display elements belonging to one unit group decreases in a lower level in the hierarchy.

For example, referring to FIG. 2, three display elements are registered in the display item information 540 whose operation-procedure step 1D 510 indicates "1-3". One of the three display elements is assigned the display item ID 541 indicating "1" in the left part, and the other two display elements are assigned the display item ID 541 indicating "2" in the left parts. In other words, the number of display elements belonging to an upper-level group whose operation-procedure step ID 510 indicates "1-3" is three, in which the number of display elements belonging to a lower-level group whose display item ID 541 indicates "1" in the left part is one, and the number of display elements belonging to a lower-level group whose display item ID 541 indicates "2" in the left part is two. Thus, the number of display elements belonging to one unit group decreases at a lower level in the hierarchy.

In the same manner, by using the right part of the display item ID 541, the number of display elements belonging to one unit group decreases.

As described above, in this preferred embodiment, a plurality of display elements are classified into hierarchical groups such that the number of display elements belonging to one unit group can decrease in a lower level in the hierarchy.

The display element change section 152 changes arrangement of a plurality of display elements in the layout of the operation screen, on a unit group basis. The display element change section 152 shifts the unit group regarding the change of the arrangement of the plurality of display elements, sequentially from a lower level in the hierarchy to an upper level in the hierarchy. The screen layout determination section 153 calculates a visibility evaluation value for evaluating the visibility of the arrangement of the plurality of display elements obtained as a result of the change made by the display element change section 152. Based on the visibility evaluation value, the screen layout determination section 153 causes the display element change section 152 to recursively change the arrangement of the plurality of display element.

Next, operations of the display element change section 152 and the screen layout determination section 153 will be described in detail. The display element change section 152 firstly changes arrangement of display elements included in the lowest-level unit group.

For example, referring to FIG. 2, the three display elements in total indicating "Symbol", "Button", and "Button" are registered in the display item information 540 corresponding to the operation-procedure step 1D 510 indicating "1-3". Among them, the two display elements indicating "Button" are assigned the display item ID 541 indicating "2" in the left part, and classified as the lowest-level unit group. Accordingly, in this example, the display element change section 152 firstly changes arrangement of the two display elements indicating "Button" classified as the lowest-level unit group.

Then, based on the distribution of a blank space in the display screen and the like, the screen layout determination section 153 calculates the visibility evaluation value for evaluating the visibility of the arrangement of the plurality of display elements obtained as a result of the change made by the display element change section 152. In a case where the visibility evaluation value does not satisfy predetermined criteria, the screen layout determination section 153 does not shift the unit group, and causes the display element change section 152 to recursively change the arrangement of the plurality of display elements. This change is repeated until the visibility evaluation value satisfy the predetermined criteria.

In a case where the visibility evaluation value satisfy the predetermined criteria, the display element change section 152 changes arrangement of a plurality of display elements included in an upper-level unit group in the layout of the operation screen, while maintaining the already-changed arrangement of the display elements.

For example, referring to FIG. 2, the three display elements registered in the display item information 540 corresponding to the operation-procedure step 1D 510 indicating "1-3" form an upper-level unit group relative to the lowest-level unit group mentioned above. Accordingly, in this example, the display element change section 152 changes arrangement of the three display elements while maintaining the already-changed arrangement of the two display elements indicating "Button".

FIGS. 8 and 9 are diagrams showing a situation where the display element change section 152 and the screen layout determination section 153 change arrangement of these three display elements 411A to 411C. The display element 411A, and the display elements 411B and 411C, which are shown in FIGS. 8 and 9, corresponds to the one display element indicating "Symbol", and the two display elements indicating "Button", respectively, in the operation-procedure step 1D 510 indicating "1-3" shown in FIG. 2.

In this example, the screen layout determination section 153 calculates the visibility evaluation value of the arrangement of the display elements 411A to 411C shown in FIG. 8. In the arrangement of the display elements 411A to 411C shown in FIG. 8, there is a small blank space in the vertical direction. Therefore, the visibility evaluation value calculated by the screen layout determination section 153 does not satisfy the predetermined criteria. In this case, the screen layout determination section 153 causes the display element change section 152 to recursively change the arrangement of the three display elements 411A to 411C so as to reduce the size in the vertical direction. Thus, the display element change section 152 recursively changes the arrangement of the three display elements 411A to 411C, without changing the already-changed arrangement of the display element 411B and the display element 411C. Consequently, as shown in FIG. 9, the display elements 411A to 411C are arranged with a sufficient blank space ensured in both the vertical direction and the horizontal direction.

Then, the screen layout determination section 153 calculates the visibility evaluation value of the arrangement of the display elements 411A to 411C shown in FIG. 9. In a case where the visibility evaluation value obtained as a result of the calculation satisfies the predetermined criteria, a search for determining the arrangement of the display elements 411A to 411C is completed. Thus, finally, the visibility evaluation value of the display elements 411A to 411C included in the display item satisfies the predetermined criteria.

In the graphical user interface device according to this preferred embodiment described above, the arrangement of the plurality of display elements is recursively changed based on the visibility evaluation value. This can provide more options for arrangement of the display elements, and allow a display with a good visibility without causing a bias in the distribution of the blank spaces in the screen.

Preferred Embodiment 5

A large number of accident events can be assumed in a large-scale plant. Even against the same kind of accidents, different accident countermeasure operations may be performed depending on the scale of failure. However, the actual plant operation manual specifies only typical cases, and therefore in an actual operation, the operator often changes operations specified in the manual or adds operations with reference to the plant operation manual. Nevertheless, for example, in the device disclosed in Japanese Patent Application Laid-Open No. 1994-27287, the display items to be displayed on the screen with respect to each situation of the plant are fixed, and therefore a screen display has to be switched to search for a desired measurement value, which is troublesome. Accordingly, in this preferred embodiment 5, the operation can be performed with the plant operation manual partially edited and modified.

Figure 10:
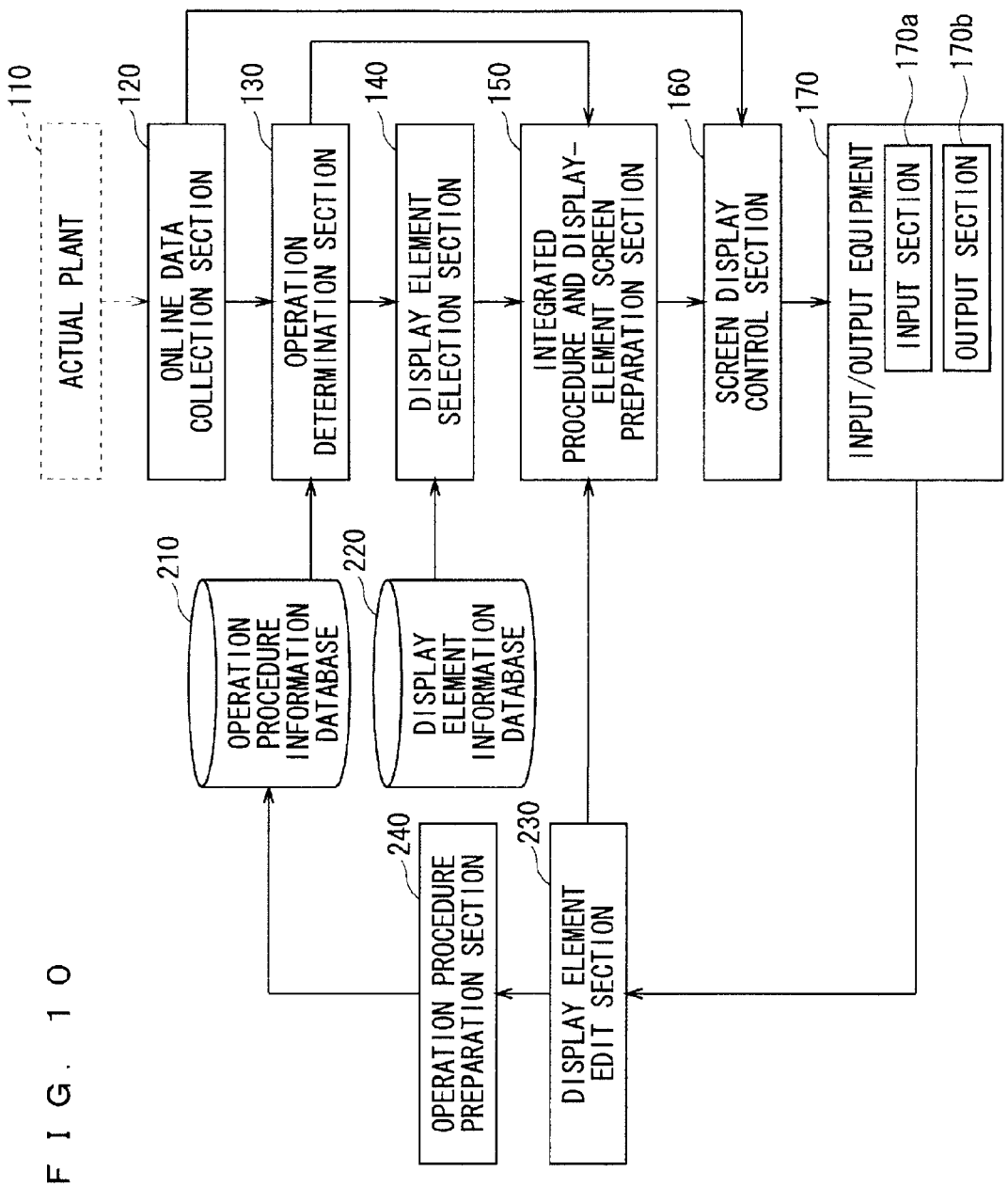
FIG. 10 is a block diagram showing a configuration of a graphical user interface device according to a preferred embodiment 5.

FIG. 10 is a diagram showing a configuration of a graphical user interface device according to this preferred embodiment 5. Hereinafter, in a description of the graphical user interface device according to this preferred embodiment, the same component parts as those of the graphical user interface device according to the preferred embodiment 1 will be denoted by the common corresponding reference numerals, to omit repetition of the description.

The graphical user interface device according to this preferred embodiment is identical to the graphical user interface device according to the preferred embodiment 1, except that a display element edit section 230 and an operation procedure preparation section 240 are additionally provided.

The input section 170a of the input/output equipment 170 receives an external operation for editing a layout of the operation screen containing the procedure information 520 and the display item to be displayed on a single screen of the input/output equipment 170, and outputs an input signal corresponding to the external operation to the display element edit section 230.

Based on the input signal supplied from the input section 170a, the display element edit section 230 edits a layout of the operation screen containing the procedure information 520 and the display item in the layout of the operation screen to be displayed on a single screen of the input/output equipment 170. Here, the input signal corresponds to the operation received by the input section 170a. That is, the display element edit section 230 edits, based on the operation received by the input section 170a, a layout of the operation screen containing the procedure information 520 and the display item in the layout of the operation screen to be displayed on the single screen of the input/output equipment 170. The display element edit section 230 outputs edit information indicating edit contents to the operation procedure preparation section 240.

Based on the edit information supplied from the display element edit section 230, the operation procedure preparation section 240 modifies the operation-procedure information 500 including the procedure information 520 and the display item information 540 registered in the operation procedure information database 210. Here, the edit information corresponds to the operation received by the input section 170a. That is, the operation procedure preparation section 240 modifies, based on the operation received by the input section 170a, the operation-procedure information 500 including the procedure information 520 and the display item registered in the operation procedure information database 210.

Figure 11:
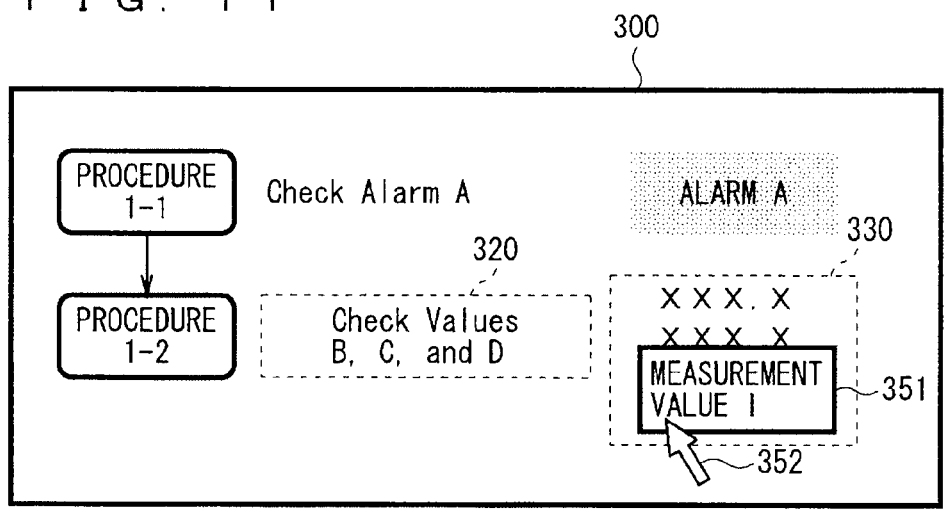
FIG. 11 is a diagram showing a layout of an operation screen prepared by the graphical user interface device according to a preferred embodiment 5.
Figure 12:
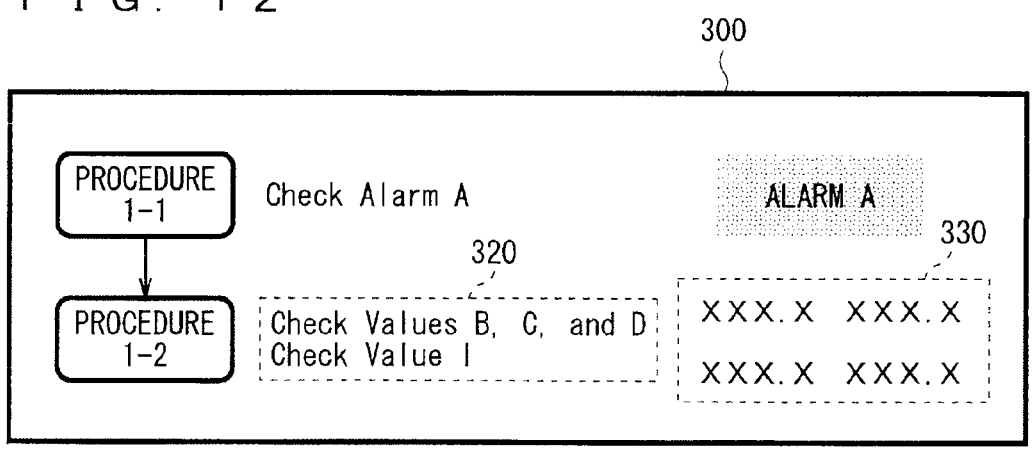
FIG. 12 is a diagram showing a layout of the operation screen prepared by the graphical user interface device according to the preferred embodiment 5.

FIGS. 11 and 12 are diagrams showing states before and after the display element edit section 230 edits a layout of the operation screen displayed on the screen of the input/output equipment 170. In the following, with reference to FIGS. 11 and 12, a description will be given of addition of measurement value information (display element) that was not an object to be monitored.

FIG. 11 shows a screen displayed on the input/output equipment 170 after the edit is made. As shown in FIG. 11, on the screen of the input/output equipment 170, the procedure information 520 indicating "Check Values B, C, and D" is displayed in a procedure information display 320, and three pieces of measurement value information (display elements) corresponding to the respective values are displayed in an image information display 330.

On the screen displaying a layout of the operation screen, a screen pointer 352 is additionally displayed. The screen pointer 352 is operated by the operator through the input section 170a. Using the screen pointer 352, a measurement value icon 351 indicating the measurement value (here, a measurement value I) desired to be added to the image information display 330 is selected, and dragged and dropped on the image information display 330. In this case, the display element edit section 230 outputs commands to the integrated procedure and display-element screen preparation section 150. The commands are for adding to the procedure information display 320 procedure information 520 including a fixed phrase "Check Value I", and for adding to the image information display 330 a measurement value information (display element) indicating the measurement value I. Based on the commands given from the display element edit section 230, the integrated procedure and display-element screen preparation section 150 edits the layout of the operation screen to be displayed on the input/output equipment 170, and outputs the resulting layout of the operation screen to the screen display control section 160.

FIG. 12 shows a screen displayed on the input/output equipment 170 after the edit is performed. As shown in FIG. 12, on the screen of the input/output equipment 170, procedure information 520 indicating "Check Values B, C, and D" and "Check Value I" is displayed in the procedure information display 320, four pieces of measurement value information (display element) corresponding to the procedure information 520 are displayed in the image information display 330.

The operation procedure preparation section 240 receives, from the display element edit section 230, the edit information indicating addition of the procedure information 520 and the display item, and overwrites a corresponding part of the operation-procedure information 500.

In the above description, the graphical user interface device adds the measurement value information (display element) to the display item to be monitored. Here, in the graphical user interface device according to this preferred embodiment, not only addition of the measurement value information, but also deletion of the measurement value information (display element) from the display item to be monitored or change in the arrangement of the screen display and the order of the operation procedure, may be performed.

In the graphical user interface device according to this preferred embodiment described above, the input section 170a is operated and thereby a layout of the operation screen and the operation-procedure information 500 can be edited and changed. Therefore, the operation can be performed with the plant operation manual being partially edited or changed.

Preferred Embodiment 6

In the large-scale plant, a plurality of control operation workers may coordinate to perform a plant operation. In general, because of a hardware layout, operators are located at a distance from one another, and the operators cannot visually confirm contents of the operations performed by each other. Therefore, in a case of the coordinated operation, they orally confirm each other's operations. However, when a plant accident occurs, an alarm sound or the like is outputted in a monitor control room so that it is difficult to perform the coordinated operation while orally confirming each other's operations. In view of this, in this preferred embodiment 6, the coordinated operation can be performed surely and easily.

Figure 13:
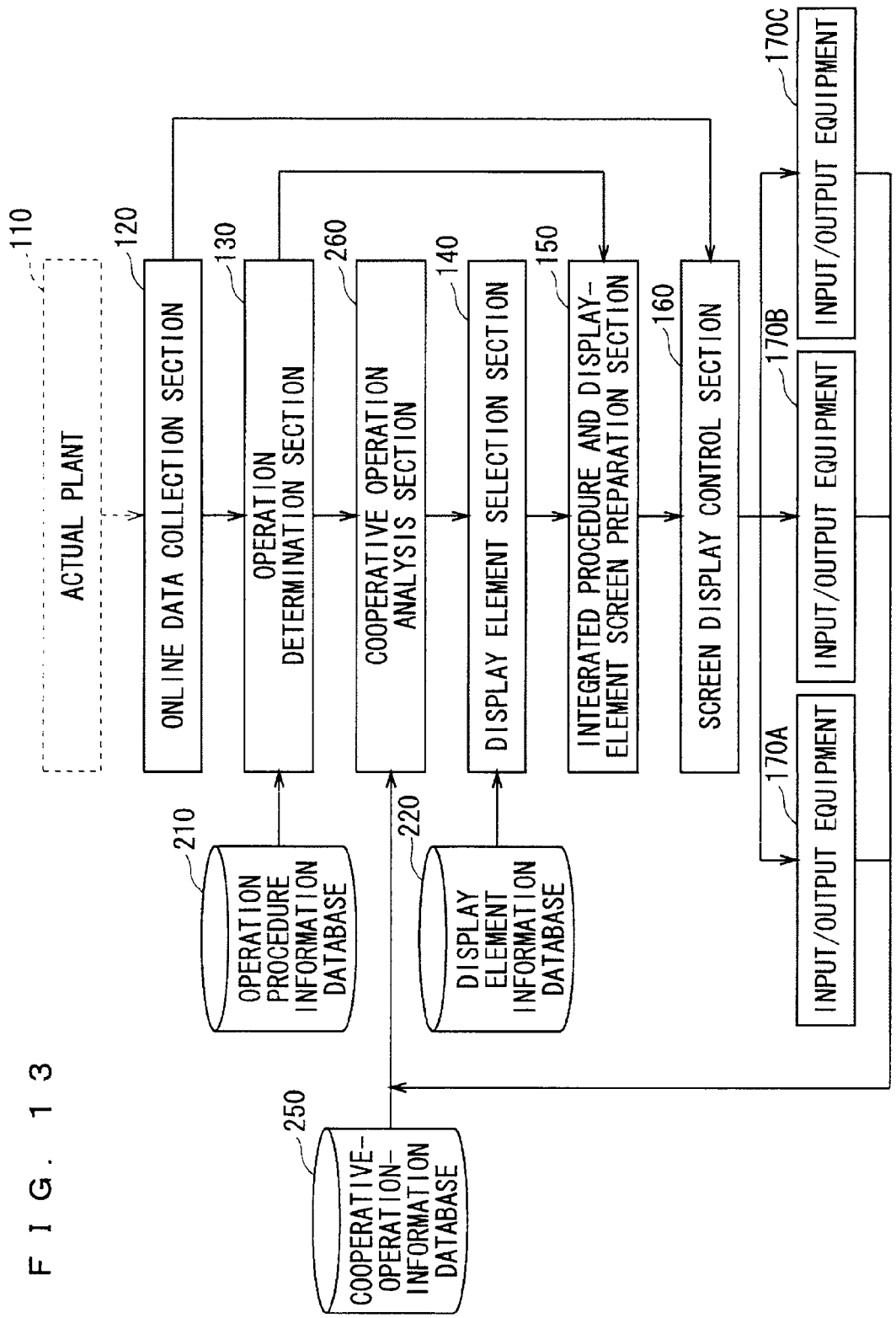
FIG. 13 is a block diagram showing a configuration of a graphical user interface device according to a preferred embodiment 6.

FIG. 13 is a diagram showing a configuration of a graphical user interface device according to this preferred embodiment 6. Hereinafter, in a description of the graphical user interface device according to this preferred embodiment, the same component parts as those of the graphical user interface device according to the preferred embodiment 1 will be denoted by the common corresponding reference numerals, to omit repetition of the description.

The graphical user interface device according to this preferred embodiment is identical to the graphical user interface device according to the preferred embodiment 1, except that a cooperative-operation-information database 250 and a cooperative operation analysis section 260 are additionally provided. Moreover, a plurality of input/output equipments 170A to 1700 each corresponding to the input/output equipment 170 are also provided.

Figure 14:
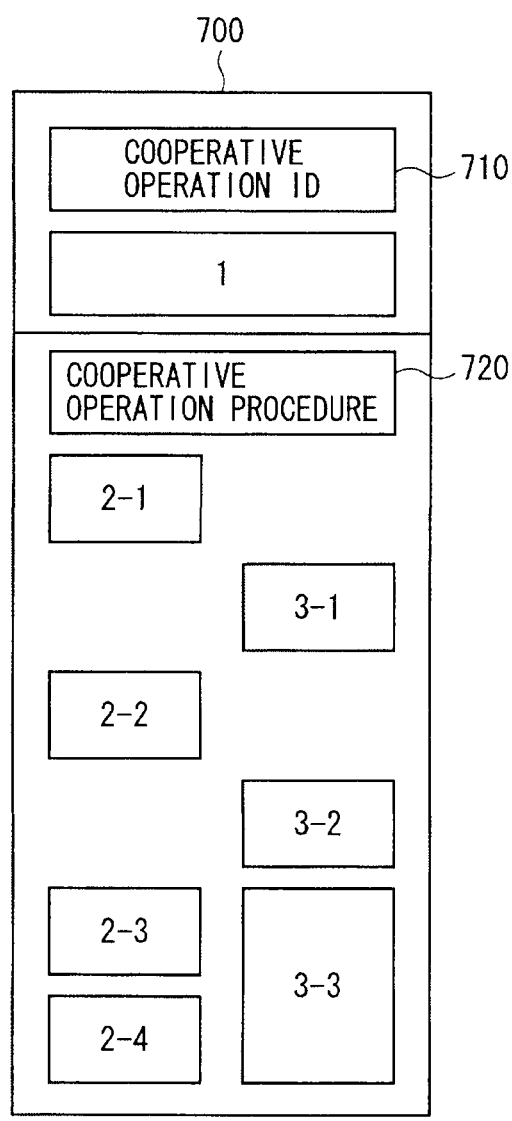
FIG. 14 is a diagram showing an example of contents registered in a cooperative-operation-information database.

FIG. 14 is a diagram showing an example of contents of cooperative operation-procedure information 700 registered in the cooperative-operation-information database 250. The cooperative operation-procedure information 700 shown in FIG. 14 includes a cooperative operation ID 710 and a cooperative operation procedure 720. The cooperative operation ID 710 is uniquely assigned to each cooperative operation procedure.

The cooperative operation procedure 720 is registered in the cooperative-operation-information database 250. The cooperative operation procedure 720 includes a combination of a plurality of operation steps included in a plurality of operation procedures that should be concurrently performed. In this preferred embodiment, a plurality of operation-procedure step IDs 510 (operation step) registered in the operation-procedure information 500 are registered in the cooperative operation procedure 720 such that the plurality of operation-procedure step IDs 510 are combined with each other along the order in which they should be performed. The cooperative operation procedure 720 includes operation steps "2-1" to "2-4" of an operation procedure "2", and operation steps "3-1" to "3-3" of an operation procedure "3".

The operation steps are performed in the order from the upper side to the lower side of the cooperative operation procedure 720 shown in FIG. 14. More specifically, the operation steps "2-1", "3-1", "2-2", and "3-2" are sequentially performed, and then the operation steps "2-3" and "2-4" are performed concurrently with the operation step "3-3". Although the cooperative operation procedure 720 having a combination of two operation procedures is described here, the cooperative operation procedure 720 may have a combination of three or more operation procedures.

Referring to FIG. 13 again, based on the current operation step determined by the operation determination section 130, the cooperative operation analysis section 260 determines an operation step to be displayed, from the plurality of operation steps included in the cooperative operation procedure 720. In this preferred embodiment, based on the current operation step determined by the operation determination section 130, the cooperative operation analysis section 260 determines the current operation step and operation steps around the current operation step, from the plurality of operation steps included in the cooperative operation procedure 720.

The integrated procedure and display-element screen preparation section 150 sorts the operation steps determined by the cooperative operation analysis section 260 on an operation-procedure basis, and prepares a layout of the operation screen allowing the operation steps to be simultaneously displayed on a single screen of the interface device.

FIG. 15 is a diagram showing an exemplary layout of the operation screen prepared by the integrated procedure and display-element screen preparation section 150 according to this preferred embodiment and displayed within the outer frame 300 of a single screen of the input/output equipment 170. This layout of the operation screen contains the operation steps "2-1", "3-1", "2-2", and "3-2" among the operation steps included in the cooperative operation procedure 720 shown in FIG. 14.

In the layout of the operation screen, a plurality of operation steps are arranged in the order in which they should be performed along the direction from the upper side to the lower side of the screen. More specifically, the operation step "3-1" is performed between the operation steps "2-1" and "2-2". Therefore, the operation step "3-1" is arranged between the operation steps "2-1" and "2-2" with respect to the vertical direction in the layout of the operation screen. The operation step "3-2" is performed after the operation step "2-2". Therefore, the operation step "3-2" is arranged below the operation step "2-2" with respect to the vertical direction in the layout of the operation screen.

In this preferred embodiment, similarly to the preferred embodiment 1, the current operation step (here, "procedure 2-2" and "procedure 3-1") is highlighted so as to be distinguishable from the other operation steps. This can bring the operator's attention to the current operation step.

In the graphical user interface device according to this preferred embodiment described above, the operation steps included in a cooperative operation procedure are sorted on an operation-procedure basis and displayed on a single screen. Accordingly, in a situation where a plurality of persons cooperative with one another to perform an operation, even if oral communication between an operator and a supervisor is interrupted by an alarm sound or the like, the operator and the supervisor can visually share the contents of the cooperative operation. This enables the coordinated operation to be surely and easily performed.

Preferred Embodiment 7

In the preferred embodiment 2 described above, a part of the procedure operation step is extracted and displayed, and more specifically only the current operation step and the same-procedure operation steps around the current operation step are displayed on the input/output equipment 170.

However, in a case where, for example, the edition of adding display elements as described in the preferred embodiment 5 is performed many times, the area necessary for displaying the selected and added display elements is increased, and the area cannot fall within the display area of the input/output equipment 170.

Therefore, in this preferred embodiment, in a case where the procedure operation steps around the current operation step are changed (added), the integrated procedure and display-element screen preparation section 150 (such as the screen layout determination section 153 of the preferred embodiment 4) calculates a visibility evaluation value for evaluating the visibility of the display element information obtained as a result of the change, and determines whether or not the visibility evaluation value exceeds an upper limit value of a predetermined range. In a case where the visibility evaluation value exceeds the upper limit value, the display element selection section 140 re-selects display element information having a smaller data amount than that of the display element information obtained as a result of the change. Thereby, the display elements can be displayed on the display area of the input/output equipment 170 with the number of display elements being properly reduced.

On the contrary, in a case where, for example, the edition for deleting the display element as described in the preferred embodiment 5 is performed, a blank space having a relatively large area occurs on the display area of the input/output equipment 170, which is waste of a space. Therefore, in this preferred embodiment, in a case where the procedure operation steps around the current operation step is changed (deleted), in the same manner as described above, the integrated procedure and display-element screen preparation section 150 (such as the screen layout determination section 153 of the preferred embodiment 4) determines whether or not the visibility evaluation value is less than a lower limit value of a predetermined range. In a case where the visibility evaluation value is less than the lower limit value, the display element selection section 14 re-selects display element information having a larger data amount than that of the display element information obtained as a result of the change. This allows an efficient use of a blank space in the display area.

In the graphical user interface device according to this preferred embodiment described above, the range of the procedure operation steps to be displayed on the display area of the input/output equipment 170 can be appropriately selected in consideration of the visibility. This can present information without any excess and lack, and can maintain the visibility even while the operator is editing the screen.

While the invention has been shown and described in detail, the foregoing description is in all aspects illustrative and not restrictive. It is therefore understood that numerous modifications and variations can be devised without departing from the scope of the invention.

What is claimed is:

1. A graphical user interface device for use in a monitor control system for a monitor control of a plant, said graphical user interface device comprising:

an operation procedure information database in which a display item to be operated on by an operator for performing an operation of operation steps and text information forming an operation manual and describing how the display item is to be operated by the operator are registered for each of said operation steps;

a display element information database in which display element information about a display element included in said display item is registered;

the graphical user interface device being configured to
determine a current operation step from said operation steps based on information given from said plant;

select, from said display element information database, said display element information corresponding to said display item of said determined current operation step;

based on said selected display element information prepare a layout of an operation screen allowing said text information and said display item corresponding to said current operation step to be simultaneously displayed on a single screen of an interface device;

select, from said display element information database, display element information corresponding to the display items of a plurality of operation steps included in the same operation procedure as said determined current operation step;

prepare a layout of the operation screen such that the text information and the display items of the operation steps included in the same operation procedure as said current operation step are simultaneously displayed on the single screen of the interface device such that said display items and said text information corresponding to said display items are displayed adjacently to each other, wherein information about a branch in said operation procedure is registered in said operation procedure information database, said information about said branch in said operation procedure includes an identification of plural branch destinations and a conditional expression for branching, wherein one of the plural branch destinations is selected as a next operation-procedure step based on an evaluation of the conditional expression for branching, in a case where said operation procedure including said current operation step has said branch, said graphical user interface device prepares a layout of the operation screen in which text information and a display item of each of the plural branch destinations and the conditional expression for branching are simultaneously displayed on the single screen of said interface device, said display items include a plurality of display elements that are classified into hierarchical groups such that a number of display elements belonging to a unit group of display items at an upper level in the hierarchy is greater than a number of display elements belonging to a unit group of display items in a lower level in the hierarchy, said graphical user interface device being further configured to change an arrangement of said plurality of display elements in the layout of said operation screen, on a unit group basis, the plurality of display elements being displayed in alignment with the current operation step, and calculate a visibility evaluation value for evaluating visibility of the arrangement of said plurality of display elements obtained as a result of the changed arrangement and, based on said visibility evaluation value, recursively change the arrangement of said plurality of display elements, and sequentially shift a unit group at each level of the hierarchy, in order from a unit group at a lower level in the hierarchy to a unit group at an upper level in the hierarchy to change the arrangement of said plurality of display elements until the visibility evaluation value satisfies a predetermined criteria which includes maintaining a certain blank space in both a vertical and horizontal direction surrounding the arrangement of said plurality of display elements and the display items of the operation steps included in the same operation procedure as said current operation step are simultaneously displayed on the single screen.

2. The graphical user interface device according to claim 1, wherein text information forming said operation manual and arrangement position information indicating relative arrangement positions of said display items are registered in said operation procedure information database for each of a plurality of said operation steps arranged in an order.

3. The graphical user interface device according to claim 2, wherein with respect to text information and display items of all operation steps included in the same operation procedure as said current operation step, said graphical user interface device calculates the visibility evaluation value for evaluating visibility obtained in a case of performing a screen arrangement based on said arrangement position information indicating relative arrangement positions of said display items, selects said current operation step and operation steps around said current operation step that can be displayed within the single screen while said visibility evaluation value is within a predefined range, and prepares a layout of the operation screen such that said display items and said text information corresponding to said display items of said selected operation steps are displayed adjacently to each other.

4. The graphical user interface device according to claim 2, further comprising:

a cooperative-operation-information database in which a cooperative operation procedure is registered, said cooperative operation procedure having a combination of a plurality of operation steps included in a plurality of the operation procedures that should be concurrently performed, wherein the graphical user interface device is further configured to determine operation steps to be displayed from said plurality of operation steps included in said cooperative operation procedure, based on said determined current operation step, and prepare a layout of the operation screen allowing said plurality of operation steps that should be concurrently performed to be simultaneously displayed on the single screen of the interface device, said displayed operation steps being sorted on an operation procedure basis.

5. The graphical user interface device according to claim 1, further comprising:

an input section that receives an external operation for editing a layout of said operation screen containing said text information and said display items to be displayed on said single screen of said interface device, wherein the graphical user interface device is further configured to edit said layout of said operation screen containing said text information and said display items to be displayed on said single screen of said interface device, based on the operation received by said input section, and change an operation-procedure information including said text information and said display items registered in said operation procedure information database, based on the operation received by said input section.

6. The graphical user interface device according to claim 1, wherein the operation screen includes the current operation step and operation steps included in a same operation procedure as the current operation step and text information and display items corresponding to the current operation step and the operation steps included in the same operation procedure as the current operation step.

7. The graphical user interface device according to claim 6, wherein the layout of the operation screen is such that each of the text information and the display items included in the operation screen are positioned horizontally in correspondence with a corresponding one of the current operation step or one of the operation steps included in the same operation procedure as the current operation step.

8. A graphical user interface device for use in a monitor control system for a monitor control of a plant, said graphical user interface device comprising:

an operation procedure information database in which a display item to be operated on by an operator for performing an operation of operation steps and text information forming an operation manual and describing how the display item is to be operated by the operator are registered for each of said operation steps; and a display element information database in which display element information about a display element included in said display item is registered, the graphical user interface device being configured to determine a current operation step from said operation steps based on information given from said plant;

select, from said display element information database, said display element information corresponding to said display item of said determined current operation step;

based on said selected display element information, prepare a layout of an operation screen allowing said text information and said display item corresponding to said current operation step to be simultaneously displayed on a single screen of an interface device, wherein said display items include a plurality of display elements that are classified into hierarchical groups such that a number of display elements belonging to a unit group of display items at an upper level in the hierarchy is greater than a number of display elements belonging to a unit group of display items in a lower level in the hierarchy, the graphical user interface device being further configured to change an arrangement of said plurality of display elements in the layout of said operation screen, on a unit group basis, the plurality of display elements being displayed in alignment with the current operation step, and calculate a visibility evaluation value for evaluating visibility of the arrangement of said plurality of display elements obtained as a result of the changed arrangement and, based on said visibility evaluation value, recursively change the arrangement of said plurality of display elements, and sequentially shifts a unit group at each level of the hierarchy, in order from a unit group at a lower level in the hierarchy to a unit group at an upper level in the hierarchy to change the arrangement of said plurality of display elements until the visibility evaluation value satisfies a predetermined criteria which includes maintaining a certain blank space in both a vertical and horizontal direction surrounding the arrangement of said plurality of display elements and the display items of the operation steps included in the same operation procedure as said current operation step are simultaneously displayed on the single screen.

9. A method, implemented by a graphical user interface device for use in a monitor control system for a monitor control of a plant, said graphical user interface device including an operation procedure information database in which a display item to be operated on by an operator for performing an operation of operation steps and text information forming an operation manual and describing how the display item is to be operated by the operator are registered for each of said operation steps, and a display element information database in which display element information about a display element included in said display item is registered, the method comprising:

determining a current operation step from said operation steps based on information given from said plant;

selecting, from said display element information database, said display element information corresponding to said display item of said determined current operation step;

based on said selected display element information, preparing a layout of an operation screen allowing said text information and said display item corresponding to said current operation step to be simultaneously displayed on a single screen of an interface device, wherein said display items include a plurality of display elements that are classified into hierarchical groups such that a number of display elements belonging to a unit group of display items at an upper level in the hierarchy is greater than a number of display elements belonging to a unit group of display items in a lower level in the hierarchy, the method further comprising:

changing an arrangement of said plurality of display elements in the layout of said operation screen, on a unit group basis, the plurality of display elements being displayed in alignment with the current operation step;

calculating a visibility evaluation value for evaluating visibility of the arrangement of said plurality of display elements obtained as a result of the changed arrangement and, based on said visibility evaluation value, recursively changing the arrangement of said plurality of display elements; and sequentially shifting a unit group at each level of the hierarchy, in order from a unit group at a lower level in the hierarchy to a unit group at an upper level in the hierarchy to change the arrangement of said plurality of display elements until the visibility evaluation value satisfies a predetermined criteria which includes maintaining a certain blank space in both a vertical and horizontal direction surrounding the arrangement of said plurality of display elements and the display items of the operation steps included in the same operation procedure as said current operation step are simultaneously displayed on the single screen.

* * * * *